Dec. 27, 1927.  1,654,033
L. L. BISHOP
LUGGAGE CARRIER
Filed Oct. 18, 1926  2 Sheets-Sheet 1
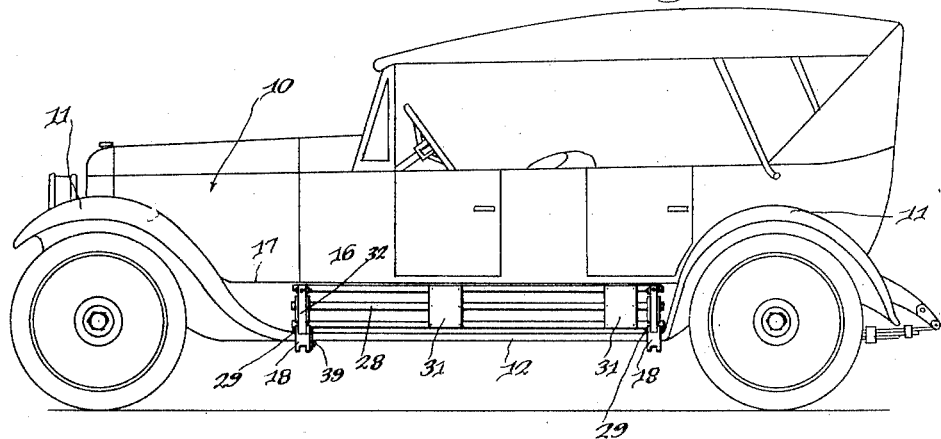
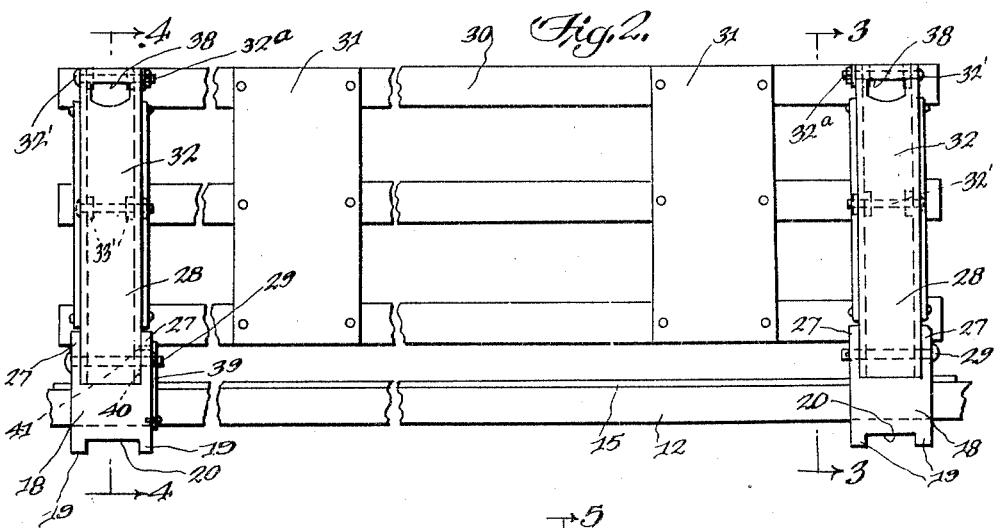
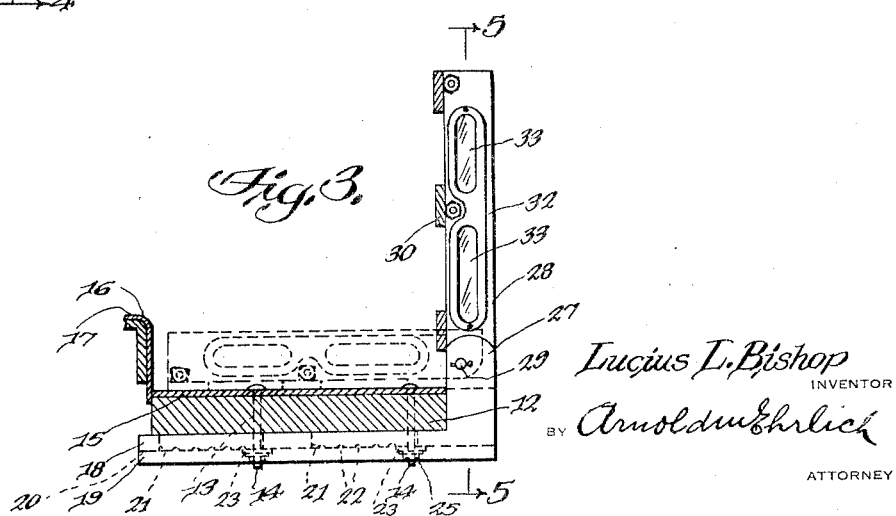
Lucius L. Bishop
INVENTOR
BY Arnold M. Ehrlich
ATTORNEY Dec. 27, 1927.

L. L. BISHOP 1,654,033

LUGGAGE CARRIER

Filed Oct. 18, 1926

Lucius L. Bishop, INVENTOR

BY Arnold␣Ehrlich

ATTORNEY

Patented Dec. 27, 1927.

1,654,033

UNITED STATES PATENT OFFICE.

LUCIUS L. BISHOP, OF CHICAGO, ILLINOIS.

LUGGAGE CARRIER.

Application filed October 18, 1926. Serial No. 142,398.

This invention relates to certain novel improvements in luggage carriers and has for its principal object the provision of an improved construction of this character which will be highly efficient in use and economical in manufacture.

Among the several objects of the invention is the provision of a luggage carrier having an illuminated guard which can be expeditiously adjusted into and out of operative position.

Other objects will appear hereinafter.

The invention consists in the novel combination and arrangement of parts hereinafter set forth and claimed.

The invention will be best understood from the description hereinafter set forth taken in connection with the accompanying drawings in which:

Figure 1 is a side elevational view of a vehicle showing the invention associated therewith;

Figure 2 is an enlarged side elevational view of the invention as shown in Figure 1;

Figure 3 is a sectional detail view taken substantially on line 3—3 of Figure 2;

Figure 4:
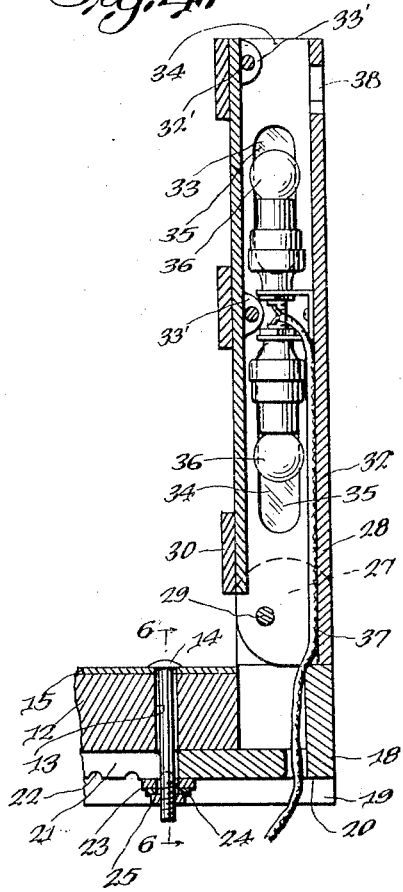
Figure 4 is a sectional detail view taken substantially on line 4—4 of Figure 2.
Figure 5:
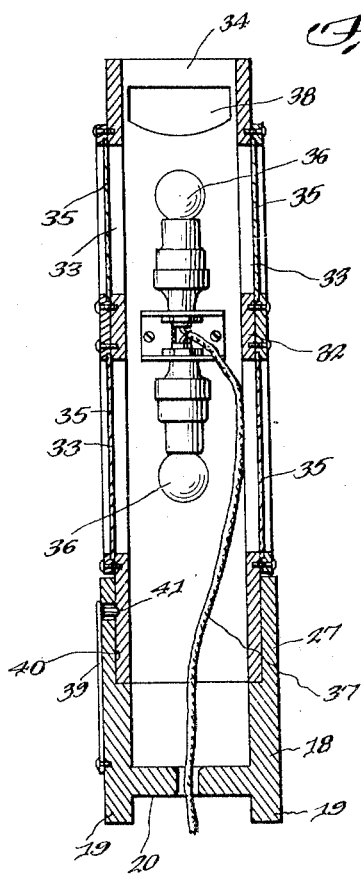
Figure 5 is a sectional detail view taken substantially on line 5—5 of Figure 3.
Figure 6:
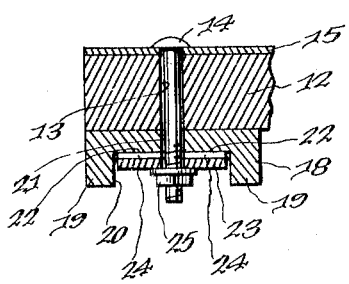
Figure 6 is a sectional detail view taken substantially on line 6—6 of Figure 4.
Figure 7:
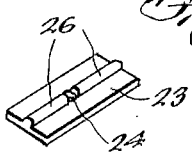
Figure 7 is a perspective view of a clamp plate embodied in the invention.

In the drawing 10 indicates a vehicle including the usual fenders 11 and running board 12. In the running board 12 I provide holes 13 for the reception of connection bolts 14 which connect a plate 15 on top of the board.

This running board is connected in the usual manner to the fenders 11 and body 16 of the vehicle and as shown in the present instance the board is disposed below the horizontal portion 17 of the body.

My improved luggage carrier includes L shape attaching arms 18 having limb portions 19 arranged beneath the board 12, and grooved longitudinally as at 20 and provided with elongated alined slots 21 thru which the bolts 14 project. The limb portions are also provided with transverse grooves 22.

The attaching arms are connected to the board 12 by means of clamping plates 23 which have openings 24 formed therein for the projection of the bolts 14. These plates are adapted to be positioned in the grooves 20 and clamped against the arms by nuts 25 threaded upon the bolts. The plates 23 have ribs 26 formed thereon which are adapted to engage in adjacent grooves of the grooves 22, said ribs serving to prevent movement of the plates.

From the above description it will be seen that the arms 18 may be adjusted relative to the board 12 to enlarge or diminish the width of the carrier.

The arms 18 have vertical limb portions 27 which extend above the plate 15 and to these portions 27 is pivotally connected to the luggage guard 28 as at 29.

This guard 28 includes a framework 30 comprising foot board 31 whereby when the guard is arranged in the position shown in dotted lines, Figure 3, the foot may be placed thereon to afford convenient passage to and from the vehicle.

The opposite end portions 32 of the guard are boxlike in structure having sight openings 33 and 34 formed therein, said openings 33 being closed by transparent closures 35.

Arranged in the box structures are lighting elements 36 which are connected to a control switch (not shown) by a conductor 37. When the lights are energized the side of the vehicle will be illuminated when the guard is in either of its two positions.

At this time it is pointed out that if desired one of the lights may be connected to an extension cord (not shown) so that said light may be used as a trouble lamp.

If necessary the guard may be secured in operative position by means of straps (not shown) having corresponding ends connected to portions 38 of the guard.

The guard is detachably latched in either of its two positions by a spring pressed latch pin 39 which is adapted to engage in a keeper hole 40, when the guard is arranged upon the board 12 and a keeper hole 41 when the guard is in operative position.

The guard frame may be adjusted vertically relative to the end portions 32 by removing the bolts 32' and replacing them through the ears 33' below the ears thru which the bolts as now shown project.

While I have illustrated and described the preferred form of construction for carrying my invention into effect this is capable of variation and modification without departing from the scope of the appended claims.

What I claim as new and useful and desire to protect by Letters Patent is:

1. In a luggage carrier, an attaching part, upright boxlike posts adapted to be supported upon and pivotally connected to said attaching part, apposed side walls of said posts having light openings therethrough, and transparent panels in said openings.

2. In a luggage carrier, an attaching part, upright boxlike posts supported by and pivotally connected to said attaching part, a guard frame mounted for vertical adjustment on said posts, apposed side walls of said posts having light openings therethrough, and transparent panels in said openings.

In witness whereof, I have hereunto subscribed my name this 4th day of October A. D., 1926.

LUCIUS L. BISHOP.